United States Patent [19]
Freissle

[11] 3,980,555
[45] Sept. 14, 1976

[54] REPLACABLE SCREEN WITH FRAME

[75] Inventor: Manfred Franz Axel Freissle, Johannesburg, South Africa

[73] Assignee: Screenex Wire Weaving Manufacturers Limited, Alberton, Transvaal, South Africa

[22] Filed: July 25, 1974

[21] Appl. No.: 491,789

[30] Foreign Application Priority Data
Aug. 24, 1973 South Africa.................... 73/5815
Jan. 2, 1974 South Africa.................... 74/0027

[52] U.S. Cl............................... 209/408; 209/399
[51] Int. Cl.²............................. B07B 1/46
[58] Field of Search ......... 209/399, 394, 395, 392, 209/397, 405, 408; 29/453, 451

[56] References Cited
UNITED STATES PATENTS

| | | | |
|---|---|---|---|
| 1,718,385 | 6/1929 | Sherwood | 209/397 |
| 2,740,525 | 4/1956 | Werner | 209/399 |
| 2,896,889 | 7/1959 | Hershberger | 29/453 X |
| 2,914,177 | 11/1959 | Parks | 209/394 X |
| 3,042,206 | 7/1962 | Olender | 209/395 |
| 3,194,397 | 7/1965 | Taege | 209/394 |
| 3,273,745 | 9/1966 | Stel | 29/453 X |
| 3,624,867 | 12/1971 | Reynolds | 29/451 X |
| 3,811,570 | 5/1974 | Holding | 209/399 |
| 3,900,393 | 8/1975 | Wilson | 209/399 |

FOREIGN PATENTS OR APPLICATIONS

| | | | |
|---|---|---|---|
| 881,330 | 11/1961 | United Kingdom | 209/392 |
| 1,001,166 | 8/1965 | United Kingdom | 209/399 |

OTHER PUBLICATIONS
Chem. Dictionary pp. 767, 768, 1971 Van Nostrand.

*Primary Examiner*—Robert Halper

[57] ABSTRACT

The invention relates to a wear-resistant element in the form of a screen or a lining which has protrusions by means of which the element may be replaceably secured to a support frame. The wear-resistant element is moulded in a synthetic plastics material such as polyurethane.

4 Claims, 14 Drawing Figures

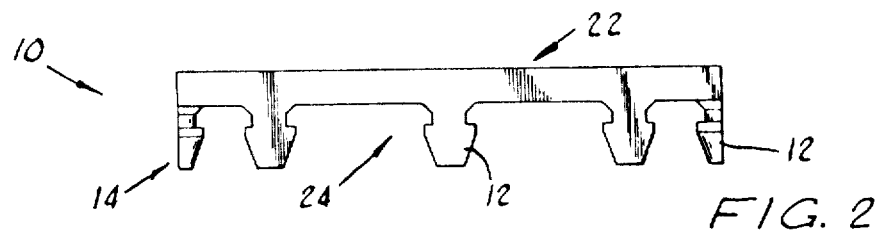
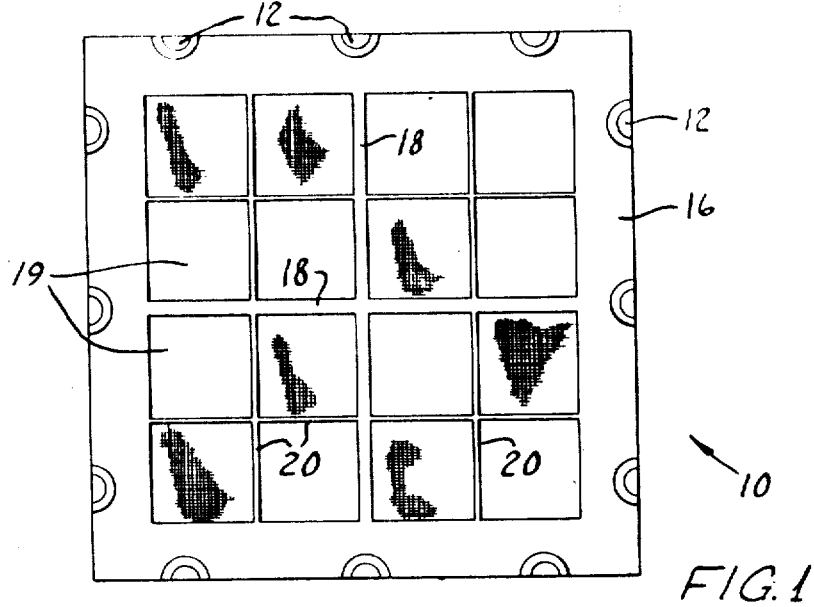
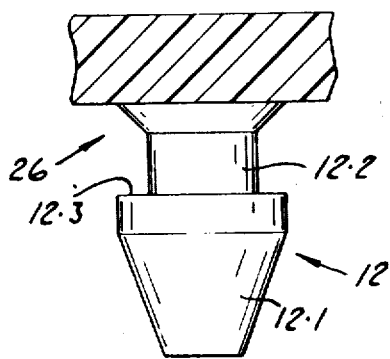
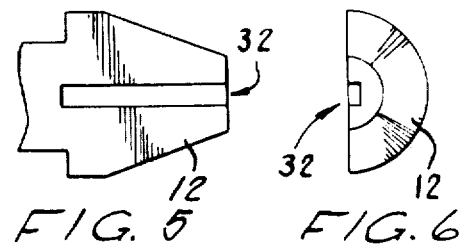
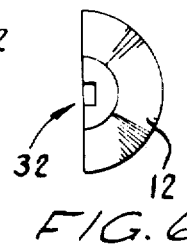
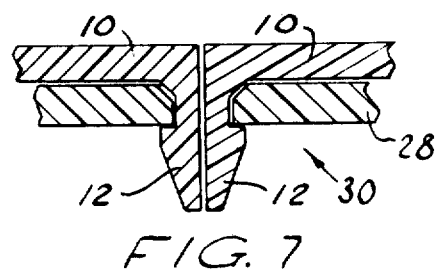
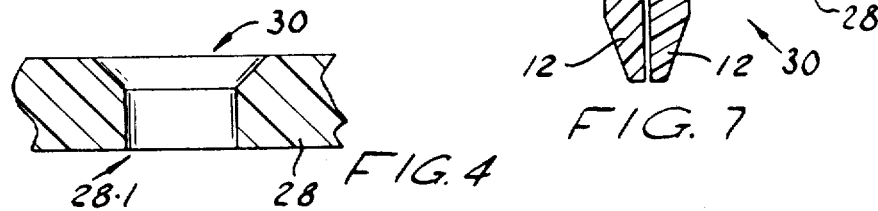

REPLACABLE SCREEN WITH FRAME

BACKGROUND TO THE INVENTION

This invention relates to a wear-resistant element. It further relates to a mould for making such an element and to a support frame for such an element. It relates in particular to a wear-resistant element which is a screen for separating particulate material, and to a wear-resistant element which forms a wear-resistant lining, covering or wall.

According to the invention there is provided a wear-resistant element having protrusions adapted to clip into corresponding openings in support means to thereby releasably secure the element to the support means.

The element and the protrusions may be integral. They may conveniently be of a synthetic plastics material such as polyurethane and may accordingly be integrally moulded in one piece, for example by injection moulding. A supporting element, such as a metal grid may be embedded in the element.

The protrusions may be slightly off-set with respect to the corresponding openings in the support means to thereby tension the screening element when it is secured to the support means. The protrusions may further be of a slightly larger size than the openings, thereby ensuring a tight interference fit.

The element may be of substantially rectangular panel-like form, having width and height dimensions substantially greater than its thickness.

When the element is in the form of a panel it may have a first surface which is subjected to wear and a second opposite surface which may be adapted to abut the support means.

The protrusions may have formations adapted to engage with a side of the support means opposite to the side to which the element is secured. Thus the protrusions may be substantially mushroom- or hook-shaped.

The protrusions may be tapered outwardly around their bases to correspond with tapering bores of the corresponding openings in the support means. The protrusions may further be provided with grooves enabling the protrusions to be compressed to facilitate removal of the protrusions from the openings.

The support means may be in the form of a frame, or substantially solid except for the openings adapted to engage the protrusions.

The sides of the element may have locating formations thereon, to engage with corresponding formations on the support means, further to locate and support the element.

The wearing surface of the element may be smooth, or it may have formations thereon such as ridges, cavities, or ribs, depending on the particular application.

Also according to the invention there is provided a mould for making a wear-resistant element according to the invention.

Further according to the invention there is provided support means for supporting a wear-resistant element in accordance with the invention, the support means having a plurality of openings therein adapted to engage with the protrusions on a wear-resistant element in accordance with the invention to thereby clip the element to the support means.

The openings may have tapered rims.

The support means may be a frame, a panel or a latticed structure.

It is known by the applicant that screens used for screening ore in mining operations are provided in separate sections that are secured to a supporting frame. However, due to the problem of properly tensioning these sections, the sections are of relatively large sizes, for example 180cm by 120cm. If a part of a section becomes worn or damaged, the entire section must be replaced although the worn or damaged part may constitute only a small area of the entire screen section. This results in a waste of material and tends to increase the cost of the operation.

Furthermore, the sizes of the vibratory frames tend to vary from customer to customer so that a manufacturer is forced to manufacture and maintain in stock a range of screen sections of different sizes in order to be able to satisfy his different customers.

Some of the methods known to the applicant of securing the screen sections to the supporting frame tend to obstruct a relatively large part of the screen section, thereby resulting in a relatively smaller portion of the screen section which is available for screening the particulate material. This also requires that the individual screen sections are relatively large.

The invention accordingly extends to a screening element comprising a wear-resistant element in accordance with the invention, the wear-resistant element being provided with screening apertures.

The screening element may have an upstream side and a downstream side and the screening apertures may diverge from the upstream side to the downstream side.

Further according to the invention there is provided a screen comprising a supporting frame having a plurality of apertures therein, and a screening element in accordance with the invention secured over each aperture, the screening element being secured to the supporting frame by means of the protrusions on the screening element being engaged with the support frame.

The protrusions may be clipped into corresponding openings provided around the apertures in the support frame.

The protrusions of adjacent screening elements may be clipped into the same openings in pairs.

The protrusions on the screening elements may be off-set with respect to the openings in the support frame to thereby tension the screening elements on the support frame.

Further according to the invention there is provided a wear-resistant lining which includes at least one wear-resistant element in accordance with the invention.

The lining may further include support means and a plurality of the wear-resistant elements secured thereto by means of the protrusions on the wear-resistant elements being engaged with the support means.

Still further according to the invention there is provided a covering or wall which includes a plurality of wear-resistant elements in accordance with the invention.

A wear-resistant element in accordance with the invention may be employed to line bins, chutes and the like in which abrasive granular materials, such as crushed mineral ores, are stored or conveyed, such as in mining and ore refining and crushing operations.

The invention will now be described, by way of examples, with reference to the accompanying drawings, in which:

FIG. 1 shows a plan view of a wear-resistant element according to the invention which is in the form of a screening element;

FIG. 2 is an end view of the screening element of FIG. 1;

FIG. 3 is a fragmentary view on an enlarged scale, showing a substantially hook-shaped protrusion on the screening element;

FIG. 4 is a fragmentary view of a section through a screen support frame;

FIG. 5 is a fragmentary view showing another protrusion having an axial groove therein;

FIG. 6 is an end view of the protrusion of FIG. 5;

FIG. 7 is a fragmentary view of a pair of adjacent screening elements secured to a screen support frame;

Figure 8:
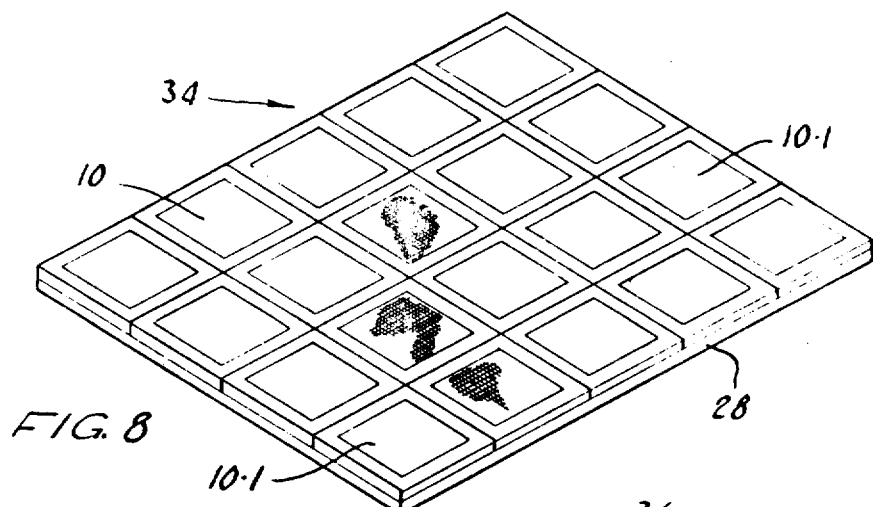
FIG. 8 is a three-dimensional view of a screen composed of a plurality of separate screening elements.

Referring to FIGS. 1 and 2, reference numeral 10 generally indicates a wear-resistant element which is in the form of a screening element of a wear resisting synthetic plastics material, such as a polyurethane. The screening element 10 is injection-moulded in one piece and it has a plurality of substantially hook-shaped protrusions 12 integral therewith. As shown, the protrusions 12 are arranged three on a side and they have flat sides 14 which are flush with the edges of the element 10.

The screening element 10 has a relatively thick border portion 16 with a pair of perpendicular primary strengthening ribs 18 and two pairs of perpendicular secondary strengthening ribs 20. Between the strengthening ribs 18, 20 are relatively thinner portions 19 having a plurality of screening apertures therein.

The screening element 10 has an upstream side 22 and a downstream side 24. The protrusions 12 are located on the downstream side 24.

Referring to FIG. 3, a protrusion 12 of the screening element 10 is shown in greater detail. The protrusion 12 is substantially hook-shaped and it has a head 12.1 and a stem 12.2. The stem 12.2 is tapered outwardly at its base, as shown at 26. The function of this taper 26 will be described below.

In FIG. 4, a portion of a vibratory support frame 28 is shown. The support frame 28 has a plurality of apertures (not shown) therein, an aperture being provided for each screening element 10. The screening elements 10 are located over the apertures. The support frame 28 further has a plurality of openings 30 around the apertures, the openings 30 around each aperture corresponding in number with the number of the protrusions 12 on the screening element 10. (Only one opening 30 is shown in FIG. 4).

The openings 30 are tapered around their rims to facilitate the insertion of the protrusions 12. The tapers 26 on the protrusions 12 are shaped to mate with the tapers 26 of the openings 30. Each protrusion has a shoulder portion 12.3 which engages with a side 28.1 (FIG. 4) of the support frame 28 causing the protrusion 12 to be clipped onto the support frame 28. The taper 26 on the protrusion 12 provides extra strength around the base of the protrusion 12.

When the screening element 10 is clipped onto the support frame 28 in the above fashion, it may be removed by cutting off the protrusions at their shoulder portions 12.3. Alternatively, in another embodiment of the invention, the protrusions 12 may be provided with longitudinally extending grooves 32, as shown in FIGS. 5 and 6. The grooves 32 enable the protrusions 12 to be compressed so that they can be removed from the openings 30.

A screen for use, for example, at a mine, is formed by clipping a plurality of the screening elements 10 onto the support frame 28. The protrusions 12 of two adjacent elements 10 are located in the same opening 30, as shown in FIG. 7. A screen 34 formed by the elements 10, is shown in FIG. 8. As shown, the elements 10 are located in abutting relationship on the frame 28 to form a continuous screening surface.

The protrusions 12 on the screening elements 10 are slightly off-set with respect to the openings 30 in the support frame 28 by about 2 to 3mm to obtain the required tensioning of the individual screening elements 10.

The screening element 10 is made by injection moulding of a wear-resisting plastics material, such as a polyurethane. It is made in a standard or unitary size of 305mm square. By using screening elements having this standard or unitary size, screens of different sizes to suit different applications can be built up.

To strengthen the element 10, a crimped wire (not shown) may be embedded in the border portion 16. The crimped wire is preferably arranged so that the waved formations thereof are located in a horizontal plane to counteract a pull towards the centre of the screening element 10.

Figure 9:
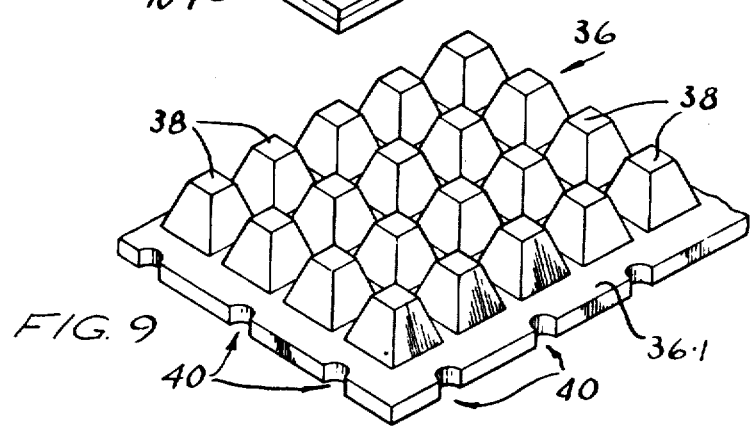
FIG. 9 is a three-dimensional view of a mould plate for making a screening element according to the invention.

Referring to FIG. 9, a mould plate 36, for making a screening element according to the invention, is shown. The plate 36 has a plurality of formations 38 standing proud of a surface 36.1 of the plate, for forming the screening apertures in the screening element. The formations 38 are tapered to form apertures on the screening element which diverge from the upstream side to the downstream side of the screening element.

The plate 36 further has a number of semi-circular recesses 40 around its edges for forming the stems 12.2 of the protrusions 12, the taper 26 not being shown in FIG. 9. Further plates (not shown) are required to complete the mould.

The screening element 10 described thusfar has protrusions 12 with a flat side 14 for mating with the flat side 14 of a protrusion 12 on an adjacent element 10. This enables the protrusions of adjacent elements to be inserted into the same hole 30. However, for screening elements, such as those numbered 10.1 in FIG. 8, which are located around the edges of the support frame 28, suitable side plates (not shown) are used for forming mushroom-shaped protrusions that have completely round stems and heads to singly fit into the corresponding holes 30 provided around the edges of the support frame 28.

Figure 10:
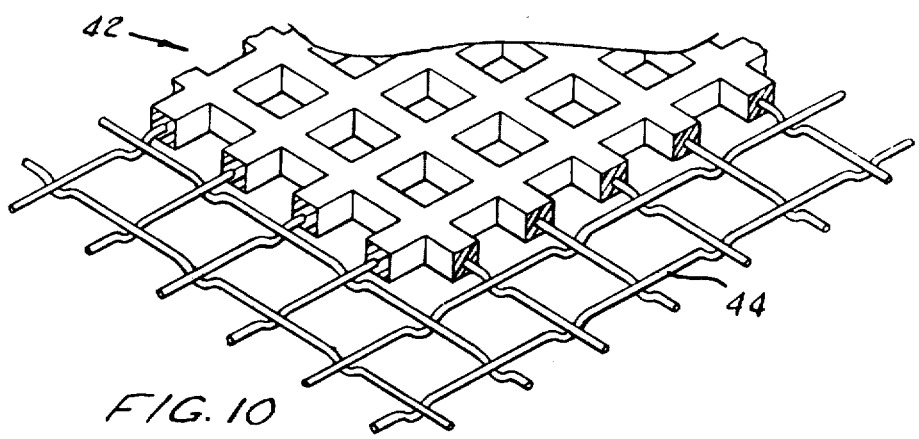
FIG. 10 is a three-dimensional fragmentary view of a screening element, according to another embodiment of the invention, consisting of a wire grid support embedded in synthetic plastics material.

In FIG. 10, a portion of a screening element 42, according to another embodiment of the invention, is shown. The element 42 consists of a wire grid 44 embedded in a wear-resisting synthetic plastics material. The wire grid 44 acts as a support in applications where a large mesh is required or heavy material is being screened.

It is an advantage of the screening elements 10 that they are of a standard or unitary size and interchangeable. The relatively small size, 305mm × 305mm, of the screening elements 10 make it possible to replace the worn or damages areas on a screen without exchanging large screening areas not yet worn out.

A further advantage is that no rubber bucker up strips are required under the screening elements 10, therefore no screening apertures are obstructed, thereby increasing the actual screening capacity of the screen. Furthermore, no clamping strips are required for the elements 10, thereby resulting in about 10cm extra screening area on each side of the screen.

The grid type vibratory support frame 28 also acts as a support for the screening elements 10, thereby adding to the overall strength of the screen.

The screening elements 10 are provided in a standard or unitary size of 305mm by 305mm, therefore a screen for fitting a particular vibrator may be built up by using an appropriate number of the elements 10. Therefore, on screening plants where many sizes of vibrators are used, the screening elements may be made in such a way that they will fit any size of vibrator and thereby a reduction on stocks for the screening elements is achieved, because only one sized screening elements need be stocked, which screening elements are prefabricated.

It is also possible with the screening elements 10 to provide specially strengthened elements in areas on the screen where extra heavy wear takes place, for example under chutes. These special elements are then clipped onto the support frame 28 in the areas subjected to the heavy wear.

By mounting the elements 10 through the clipping arrangement, clamping plates, bolts, springs, centre holding down strips and hook-bolts are no longer required.

In another embodiment of the invention, the protrusions on the screening element may all have round stems and round heads, therefore, being substantially mushroom-shaped. In this embodiment, round openings are provided around the screening element apertures in the support frame, the protrusions being clipped singly into the openings.

In an alternative embodiment, the screening element may be provided with a single elongate protrusion extending along each side. In this embodiment, elongate slots are provided around the screening element apertures in the support frame for engaging the elongate protrusions.

Figure 11:
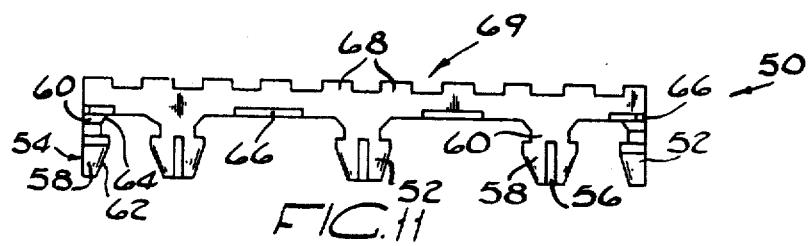
FIG. 11 is a side view of a wear-resistant element for forming a wear-resistant lining.

Referring to FIG. 11, reference numeral 50 indicates generally a wear-resistant element for forming a wear-resistant lining. The wear-resistant element is of a wear resisting synthetic plastics material such as polyurethane. It has a plurality of substantially mushroom-shaped protrusions 52 and is integrally moulded in one piece. As shown, the protrusions 52 are arranged three on a side and have flat sides 54 which are flush with the edges of the element 50.

The protrusions 52 have heads 58 and stems 60. The heads 58 are provided with slots 56 and an outward taper 62. The stem 60 also has a taper 64.

The element 50 has locating depressions 66 and ribs 68. The ribs 68 are located on the wearing surface 69. The element 50 may be reinforced, for example by wire mesh 72, as shown in FIG. 12.

Figure 12:
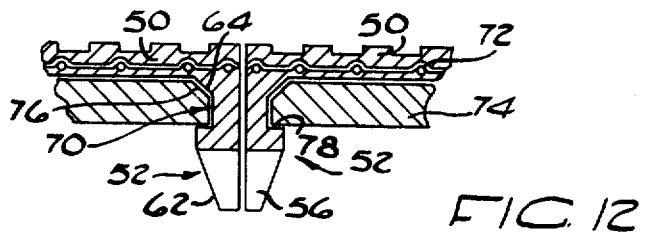
FIG. 12 is a fragmentary sectional side view on an enlarged scale of a pair of adjacent wear-resistant elements as shown in FIG. 11 secured to support means.

FIG. 12 shows a part of a wear-resistant lining having a support means 74 with two adjacent elements 50 secured thereto. As can be seen, an opening 70 in the support means 74 is adapted to clip the protrusions 52 of the element 50. The taper 62 guides the protrusion into the opening 70 which has a taper 76 corresponding to the taper 64 of the protrusion 52. The protrusion 52 is held in the opening 70 by a shoulder 78 of the protrusion 52. The slot 56 facilitates the removal of the protrusion 52.

Figure 13:
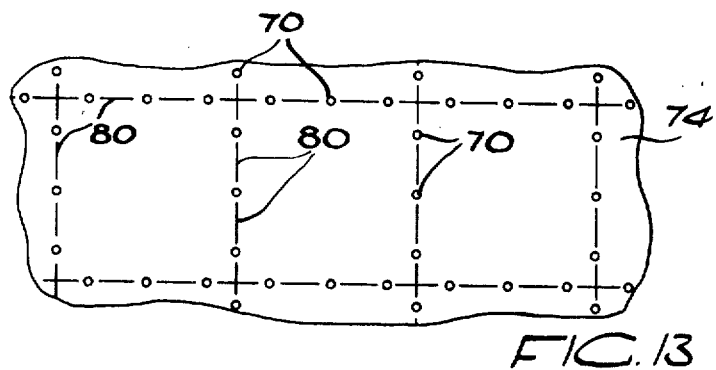
FIG. 13 is a plan view on a reduced scale of the support means shown in FIG. 12.

In FIG. 13 is shown a part of the support means 74. The openings 70 are arranged to locate the elements in a contiguous fashion. A plurality of outwardly extending locating formations 70 which engage with the depressions 66 of the elements, further locate and support the elements 50 when they are secured to the support means 74. Although the support means is shown as being substantially solid, it may also be frame-like, having a number of apertures.

Figure 14:
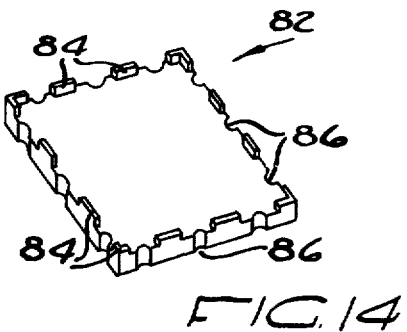
FIG. 14 is a three-dimensional view of a mould for making a wear-resistant element as shown in FIG. 11.

FIG. 14 shows a mould 42, for making the wear-resistant element 50. The plate 82 has a plurality of outstanding formations 84 for forming the locating depressions 66 of the wear-resistant element 50, and a number of semicircular recesses 86 around its edges for forming the stems 60 of the protrusions 52. For the sake of clarity the recesses 86 are not shown as having the necessary taper to produce the taper 64 of the protrusions 52. Further plates, which are not shown are required to complete the mould.

In use, the support means 74 is securely placed in a position where a wear-resistant lining is required such as a chute or bin. The support means 74 has the required dimensions, which are multiples of the dimensions of the wear-resistant elements 50 which are standard. The required number of wear-resistant elements 50 are then secured thereto to form a wear-resistant lining. In order to remove an element 50, for example to replace it when it is worn, the protrusions 12 are compressed and are withdrawn from the openings 30.

I claim:

1. A rectangular screen deck comprising a support frame having a plurality of frame elements defining a plurality of apertures therein and a plurality of unitary screening panels each panel having a peripheral surface abutting the peripheral surface of adjacent panels in side by side and edge to edge relationship, each panel being disposed on the support frame element over each aperture therein, said support frame elements being provided with spaced openings around each aperture, each screen panel comprising a wear resistant plastic material and having a plurality of screening apertures inwardly of its peripheral region and including a plurality of spigot-like protrusions spaced along its peripheral region, the protrusions projecting transversely to the plane of said panel and being integral with the panel and of the same material as the panel and solid where they project from the panel, said protrusions matingly engaging the corresponding openings in said support frame elements for replaceably securing said panel to said support frame, said protrusions each having a shoulder below and adjacent a lower edge of said opening for resisting withdrawl from the openings.

2. A screen deck as claimed in claim 1 wherein the distance between opposed protrusions of each screening panel is less than the distance between the corresponding opposed openings in the support frame elements so as to create tension in said screen panel when the protrusions are inserted into the corresponding openings for engagement therewith.

3. A screening deck as claimed in claim 1 wherein the outer ends of the protrusions are tapered and are each provided with an axial groove whereby the protrusions may be compressed to facilitate insertion of the protrusions into and removal from the openings.

4. A screen deck as claimed in claim 1 wherein the protrusions are semicircular in cross section and are provided with a flat surface extending axially thereof, said flat surface being coplanar with the peripheral surface of the screening panel, and wherein the openings in the support frame elements are circular, whereby pairs of adjacent semi circular protrusions of adjacent panels may be inserted into one circular opening in said support frame elements.

* * * * *